United States Patent Office 2,877,139
Patented Mar. 10, 1959

2,877,139

COATED ILLUMINATING GLASSWARE AND METHOD OF MANUFACTURE THEREOF

James Franklin Hyde, Midland, Mich., assignor to Corning Glass Works, Corning, N. Y., a corporation of New York No Drawing. Application February 5, 1953
Serial No. 335,387

11 Claims. (Cl. 117—97)

This invention relates to the production of light-diffusing bulbs for incandescent electric lamps and more particularly to the provision of such a bulb rendered light-diffusing by an inner surface coating capable of hiding an incandescent tungsten filament without substantially decreasing its luminosity.

An interior light-diffusing coating is obviously more desirable than a similar exterior coating, which may be soiled and abraded by handling and rough treatment and weathered by atmospheric influences. However an interior coating has certain disadvantages, for if reactive materials such as water, oxygen, organic compounds and the like are evolved from the coating of a finished lamp or if the coating flakes off and contaminates the tungsten filament, lamp life will be thereby substantially shortened. Accordingly an interior light-diffusing coating should not contain any material of sufficient volatility and reactivity to cause damage to the filament during operation of the lamp and should satisfactorily adhere to the lamp bulb surface.

Various methods have heretofore been utilized in the application of such interior coatings. For example, nonvolatile materials suspended in a liquid vehicle with an inorganic bonding agent such as sodium silicate have been sprayed onto the inner surface of a bulb in an amount sufficient only to coat the glass; such materials have also been applied in the dry state without a bonding agent to an inside-frosted (acid-etched) bulb by means of an air jet or brush, the etched surface being relied upon to provide sufficient adherence; again, solutions or suspensions containing a substance decomposable by heat to give the desired coating material have been applied by flushing such a frosted-bulb therewith while in an inverted position, allowing the excess to drain, and drying and decomposing the substance by heat.

Such methods and the resulting coatings have not been entirely suitable for commercial use, however. Sodium silicate, for example, is difficult to dehydrate and a coating containing it tends to weaken the bulb. Coating materials without a binder, applied either dry or as a flushed-on suspension thereof, do not adhere well enough even to an etched surface.

Another method consists in burning an inflammable compound of silicon within a bulb, the resulting silica smoke being deposited as formed upon the glass. The color of the light transmitted through such coating, however, appears yellowish due to the differential scattering of different wave lengths by the silica particles. Moreover the cost of bulbs coated by such process is undesirably high.

It has also been proposed to produce such a coating from silica prepared by reacting ammonium silicofluoride and ammonia in an aqueous medium by flushing an aqueous suspension or slurry of such precipitated silica onto the inner surface of a glass lamp bulb. The uniformity and adherence of such coating, particularly on a clear unfrosted bulb, are very poor, however. Such a coating not only appears thin or streaked but also flakes off too easily to withstand subsequent lamp-finishing operations.

I have now discovered that the uniformity of appearance and the adherence of such a silica coating, applied by flushing either to an inside frosted bulb or to a clear unfrosted bulb, can surprisingly be very substantially improved by incorporating with the silica in the suspension the metal-containing reaction product resulting from the reaction in an aqueous medium of ammonia and a water-soluble compound of Mg, Ca, Sr, or Ba, advantageously a mixture of water-soluble compounds of Mg and Ca, provided that the suspension is slightly thixotropic and has a definite viscosity and pH value. Such method is adapted for use with conventional bulb-frosting equipment either in lieu of or in addition to the present bulb-frosting procedure and has the additional advantage that colored or fluorescent coatings can be produced by introducing colored or fluorescent pigments into the suspension.

The new method comprises flushing the interior of the bulb with a slightly thixotropic aqueous suspension of a finely divided amorphous mixture comprising essentially $SiO_2$ and, per mol of $SiO_2$, about 0.005 to 0.7 mol on the oxide basis of the metal-containing reaction product resulting from the reaction in an aqueous medium of ammonia and a water-soluble compound selected from the group consisting of water-soluble compounds of magnesium, calcium, strontium, and barium, and mixtures of such compounds, the suspension containing 0.85 to 1.5 mols $SiO_2$ per liter of water and sufficient $NH_4OH$ to have a pH value between about 7.3 and 12 and a viscosity immediately after agitation of about 7.5 to 12 centistokes at 25° C., allowing excess suspension to drain from the bulb, and rapidly drying the adherent suspension.

PREPARATION OF SILICA

Silica, prepared by precipitation from ammonium silicofluoride in aqueous solution by reaction with ammonium hydroxide according to the following:

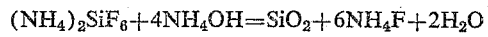

$$(NH_4)_2SiF_6 + 4NH_4OH = SiO_2 + 6NH_4F + 2H_2O$$

is amorphous; but its particle size is difficult to control and it is generally gelatinous in character and difficult to filter and wash. According to the pending application of Joseph J. Domicone, Serial No. 335,383, filed concurrently herewith, now Patent No. 2,768,063, issued October 23, 1956, the particle size of the silica so formed can be nicely controlled and its filterability can be materially improved by suitably controlling the concentration, temperature and manner of mixing the reactants; and the silica contained in the instant coating suspension is advantageously prepared in accordance with such procedure.

As set forth in such Domicone application, such control consists in using a strong aqueous solution of ammonium silicofluoride and an ammonia solution containing a stoichiometric excess of $NH_3$, preadjusting the temperature of each solution to between 25° and 37° C., and mixing them as rapidly as possible by pouring the ammonium silicofluoride solution into the ammonia solution. While other bases react similarly to precipitate $SiO_2$ from ammonium silicofluoride, their byproducts cannot as readily be separated from the $SiO_2$; and such byproducts leave non-volatile residues in the coating which either interfere with lamp-finishing operations or tend to shorten filament life. The following example is illustrative of this procedure:

An aqueous solution of amonium silicofluoride, advantageously in the proportion of about one mol per liter of water, is filtered to remove any insoluble matter, and the filtered solution at a temperature of 25° to 37° C. is mixed as rapidly as possible with an equal amount of an aqueous solution of ammonia containing about 4¼ to 5 mols of $NH_3$ per liter of water, also at a temperature of 25° to 37° C. The temperature of each solution should preferably be within one degree of the other and desirably about 31° to 32° C. Mixing should be accomplished by pouring the ammonium silicofluoride solution into the ammonia solution while vigorously stirring the mixture. To reverse the order and pour the ammonia solution into the ammonium silicofluoride solution results in a gelatinous precipitate tending to produce non-uniform coatings. So as to ensure complete precipitation, it is essential that the mixture should be ammoniacal as is indicated above, the amount of excess ammonia being advantageously between ¼ and 1 mol. Since the heat generated by the reaction raises the temperature of the reaction mixture somewhat, it is desirable to cool the reaction mixture before filtering, as by adding thereto about one liter of cold water (less than 20° C.) per mol of $SiO_2$.

In order to remove the by-product ammonium fluoride and excess ammonia the precipitated silica is filtered and washed with cold water. Washing is advantageously accomplished by redispersing the filter cake in about one liter of water per mol of $SiO_2$ and refiltering the redispersed silica. The presence of fluorine in the subsequent suspension is undesirable but its complete removal from the filter cake is very difficult if not impossible particularly if hard water is used, presumably on account of the formation of insoluble fluorides of calcium and magnesium. A residuum in the filter cake of as little as 1.5% F, while it does not harm the appearance and adherence of the coating, tends to shorten the filament life of the lamp and it is desirable that the F content should be not more than 0.5% by weight of the wet cake and preferably less than 0.2%.

On the other hand, the presence in the filter cake of a slight amount of $NH_3$ is advantageous for providing the desired pH value in the subsequent suspension. Too high a percentage of $NH_3$ should generally be avoided, however, because the addition of acid to the suspension may thereby be necessary to suitably adjust its pH value and thixotropic character. The ammonium salt resulting from such neutralization, if present in substantial amounts, may necessitate longer or hotter drying of the coating for its elimination.

The washed filter cake should not be allowed to become dry because its subsequent suspension in water is thereby made difficult. It may, if desired, be stored in sealed containers which keep it in a moist condition.

Microscopic examination of the silica prepared by this method indicates that the particle size is on the order of one-half micron.

THE SILICA SUSPENSION

To prepare a proper silica suspension the washed silica cake, of which the contents of water, fluorine, and ammonia have been determined by analysis, is dispersed by stirring it while moist into water in the proportions of approximately 0.85 to 1.5 mols $SiO_2$ per liter of water. Less than 0.85 mol tends to lower the hiding power of the coating objectionably while more than 1.5 mols tend to make the coating too dense and to lower the transmission too much. Unfrosted bulbs require a higher concentration of $SiO_2$ than frosted bulbs to effectively hide the filament. Since the amount of water necessary to produce a suspension having the desired degree of thixotropy will depend upon the percentage of ammonia in the filter cake and the resulting pH value of the liquid suspension, it is advantageous to start with more than the minimum proportion of silica, say 1.2 to 1.5 mols per liter, and subsequently to reduce the viscosity of the suspension, if necessary, by the addition of more water.

To such suspension is added the metal-containing reaction product of ammonium hydroxide with a water-soluble alkaline earth metal compound of the indicated type, said product being advantageously formed in the silica suspension by adding thereto an aqueous solution of the alkaline earth metal compound and also adding, if necessary, further $NH_4OH$ to react with such compound and/or to adjust the pH value of the suspension to within the desired range. The addition of the alkaline earth metal compound to the ammoniacal suspension results in the formation of the hydroxide and/or the carbonate of the alkaline earth metal, the amount of carbonate depending upon the amount of carbon dioxide present in the mixture. Consequently the metal-containing reaction products of ammonia with the alkaline earth metal compounds referred to herein are intended to include not only the hydroxides, if such are formed, but also the carbonates, as the case may be. When formed in the silica suspension such reaction products are commingled and intimately dispersed with the silica. The reaction product can, if desired, be prepared separately and thereafter mixed with the silica suspension. The incorporation of such alkaline earth metal compound or such reaction product with the ammonium silicofluoride solution before precipitation of the silica or with the ammonium silicofluoride reaction mixture before the fluoride has been washed therefrom by filtration would result in the objectionable formation of insoluble alkaline earth metal silicofluorides which cannot be separated from the silica and which cause nonuniformities in appearance and adherence of the coating and shorten the filament life.

Any water-soluble compound of such alkaline earth metals which is reactive with ammonia may be utilized, those compounds being preferred which react to form ammonium salts that are readily decomposed and volatilized when the coated bulb is dried at an elevated temperature, advantageously about 350° to 550° C. For this reason the formates, acetates and propionates, especially the formates, of these alkaline earth metals are particularly desirable. Organic compounds of especially high carbon content are to be avoided because of the difficulty of completely eliminating the carbon from the coated bulb. The chlorides, nitrates, and sulfates may also but less desirably be used. Bases other than $NH_4OH$ produce objectionable non-volatile or carbonaceous residues in the coating.

Amounts of the alkaline earth metal compound (and, thus, of its reaction product) as small as 0.005 mol and as large as 0.7 mol computed as the oxide per mol of $SiO_2$ may be used. Smaller amounts do not produce results that are at all satisfactory, while larger amounts are not necessary. Preferably a ratio of about 0.01 to 0.1 mol of the alkaline earth metal compound computed as the oxide per mol of $SiO_2$ is used. Within this range quite adequate adherence of the coating to the inside surface of the bulb is obtained; and a very uniform appearance is provided in a lamp made from such a bulb. Within such preferred range, moreover, the formation of undesirably large quantities of ammonium salts in the suspension is avoided.

While strontium and barium compounds produce results that are satisfactory, better results are obtained with magnesium and calcium compounds, either alone or in admixture. Of particular significance is the fact that the use of a magnesium compound materially improves the adherence of the coating.

For coating a frosted bulb, the pH value of the suspension should be between about 7.3 and 9, preferably about 8. If, after the incorporation of the reaction product of the alkaline earth metal compound and ammonia into the silica suspension, the thixotropic character of the suspension is excessive and the viscosity too great for such purpose as a result of the pH value of the suspension being too high, the pH value can be adjusted by the addition of the requisite amount of an acid such as formic, or acetic, or phosphoric acid. For adequate light diffusion and hiding power an unfrosted bulb requires a somewhat heavier coating than a frosted bulb. A heavier coating can be produced either by decreasing the amount of water in the suspension or by increasing its thixotropic character by increasing the pH value. For such purpose the pH value can be as high as 12.

If on the other hand the pH value and viscosity are too low they should be raised to the desired degree by the addition of the requisite amount of ammonium hydroxide. If after adjustment of the pH value, the silica suspension is excessively thixotropic, this may be reduced by the addition of water until the viscosity of the suspension is from 7.5 to 12 centistokes at 25° C., measured immediately after agitation of the suspension.

It is essential that the suspension be uniform in texture and free from lumps and aggregates which will cause non-uniformities in the coating. For this purpose the suspension is advantageously passed through a colloid mill several times before it is applied to the bulbs to be coated. The mill should preferably be set with a clearance of 0.003 inch or even closer.

When, as a result of its treatment in the colloid mill, the silica suspension has become homogeneous in texture and free from lumps and oversized particles, it is applied to incandescent lamp bulbs by inverting the bulbs and projecting a small stream of the suspension upwardly into each bulb and against its inner surface for a few seconds to completely cover such surface. The excess silica suspension is permitted to drain for a few seconds and the coating which remains is rapidly dried either by passing the bulbs through a heated chamber, desirably at 350° to 550° C., or preferably by directing into each bulb a jet of hot air, desirably preheated to 350° C. or above.

The bulbs are thus heated at a temperature insufficient to soften or distort the glass but high enough to eliminate coating constituents which are sufficiently volatile to be harmful to a lamp filament, including water, formate, acetate or propionate radicals, and ammonium salts. It is believed that the alkaline earth metals remain in the coating as hydroxides or oxides or carbonates, depending on the drying temperature, or perhaps as phosphates, if phosphoric acid has been used.

*Example 1*

Three mols (534 grams) of ammonium silicofluoride were dissolved in 3 liters of tap water, the solution was filtered and at a temperature of 31° C. was poured as rapidly as possible with stirring into a solution consisting of 1 liter of aqueous ammonia, specific gravity 0.895, containing 29 weight percent or 260 grams $NH_3$, diluted with 2 liters of tap water, the temperature of the latter solution being 31° C. The mixture was further diluted with 4 liters of water at 15° C. and the precipitated silica was filtered with suction. The filter cake was redispersed in 3 liters of tap water at 15° C. and the suspension was again filtered and thereafter was washed on the filter a few times. Analysis showed the wet filter cake to contain 14.7% solids, 0.05% fluorine, 0.17% $NH_3$ and about 85.3% water.

A portion (238 grams) of the wet filter cake containing about 203 cc. of water and 35 grams $SiO_2$ was placed in a container, 330 cc. of tap water were added and the silica (1.1 mols $SiO_2$ per liter of water) was dispersed therein by stirring. To the suspension were added 0.25 cc. of 85% $H_3PO_4$ and 9 cc. of an aqueous solution of magnesium and calcium formates containing 0.026 gram MgO and 0.026 gram CaO per cc. (0.01 mol MgO+0.007 mol CaO per mol of $SiO_2$) and the mixture was milled for about 10 minutes with a colloid mill set with a clearance of 0.003 inch. The pH value then amounted to 8, and the viscosity measured at 25° C. immediately after agitation was 7.7 centistokes. When an inside frosted bulb was coated with such suspension and dried for 3 minutes at 500° C., the coating was adherent, uniform in appearance with a transmission of about 95%, and the filament was completely hidden.

*Example 2*

Silica cake, prepared as in Example 1 and containing according to analysis on the wet basis 11.5% solids, 0.21% F, 0.43% $NH_3$, and about 88.5% $H_2O$ by weight, was dispersed in cold tap water in the proportions of 200 grams of the wet silica cake and 225 cc. of water. To the suspension were added 6 grams of MgO and 16 cc. formic acid (90% $HCHO_2$). The addition of 8 cc. of aqueous ammonia (29% $NH_3$) was then necessary to make the pH value of the suspension 8.2. The suspension, containing 0.392 mol of MgO per mol of $SiO_2$ and 0.92 mol of $SiO_2$ per liter of water, was then milled for several minutes in a colloid mill set with a clearance of 0.003 inch. The viscosity at 25° C. was between 8 and 9 centistokes. Frosted and unfrosted bulbs coated with such suspension and dried for about 3 minutes at about 550° C. had a uniform appearance, good filament-hiding power, and a transmission of over 94%. The adherence of the coating, even on the unfrosted bulbs, was so great that it could not be rubbed off without the aid of a sharp implement.

*Example 3*

Silica cake prepared as in Example 1 and containing according to analysis on the wet basis 12.9% solids, 0.09% F, 0.49% $NH_3$, and about 87.1% $H_2O$ by weight, was dispersed in cold tap water in the proportion of 270 grams of the wet silica cake and 220 cc. of water. To the suspension were added 0.25 cc. of 85% $H_3PO_4$ and 27 cc. of an aqueous solution of strontium formate containing 0.03 gram SrO per cc. At this stage the pH of the solution was 8.1. The suspension, containing 0.03 mol SrO per mol of $SiO_2$ and 1.2 mols $SiO_2$ per liter of water, was milled for several minutes in a colloid mill set with a clearance of 0.003 inch. Frosted bulbs coated with such suspension and dried for about 3 minutes at about 550° C. had a uniform appearance, good filament-hiding power with a transmission of over 94% and adequate adherence of the coating.

*Example 4*

About 150 grams of wet silica cake, prepared as in Example 1 and containing according to analysis on the wet basis 12.9% solids, 0.5% F, 0.95% $NH_3$, and about 87.1% $H_2O$ by weight, were dispersed in 50 cc. $H_2O$ and 200 cc. of an aqueous solution of magnesium and calcium formates containing 0.026 gram MgO and 0.026 gram CaO per cc. It was necessary to add 8 cc. of 29% aqueous ammonia to bring the pH value to 8. The suspension, containing 0.4 mol MgO and 0.29 mol CaO per mol of $SiO_2$ and 0.85 mol $SiO_2$ per liter of water, was milled for several minutes in a colloid mill set with a clearance of 0.003 inch. Frosted bulbs coated with such suspension and dried for about 3 minutes at about 550° C. had a uniform appearance and good filament-hiding power with a transmission of over 94%. The adherence of the coating was so great that it could not be rubbed off without the aid of a sharp implement.

*Example 5*

Silica cake, prepared as in Example 1 but using distilled water and containing according to analysis on the wet basis 14.9% solids, 0.002% F, 0.24% $NH_3$, and about 85.1% $H_2O$, was dispersed in cold water in the proportions of 117 grams of the wet silica cake and 190 cc. of tap water. To the suspension were added 27 cc. of an aqueous solution of barium formate containing 0.029 gram BaO per cc. To raise the pH value to 8.7 required the addition of 1 cc. of 29% aqueous ammonia. The suspension, containing 0.017 mol BaO per mol $SiO_2$ and 0.92 mol $SiO_2$ per liter of water, was milled about 3 minutes in a colloid mill set with a clearance of 0.003 inch. Frosted bulbs coated with such suspension and dried for about 3 minutes at about 550° C. had a uniform appearance, good filament-hiding power with a transmission over 94%, and adequate coating adherence.

*Examples 6–14*

If it is desired to produce a colored coating, a coloring pigment or compound free from filament-damaging constituents may be added to the silica suspension before the latter is passed through the colloid mill. Such addition may cause a change in the pH value of the suspension in which case the pH value is readjusted to between 7.3 and 9, preferably 8, by the addition of the requisite amount of ammonium hydroxide or an acid such as formic acid as the case may be. For example a pink or a flesh colored coating was produced by adding to the silica suspension, prepared according to Example 1, 1.7 grams per mol of $SiO_2$ of red pigment composed of 8.7% CdO, 77.6% CdS, and 12.2% CdSe. A darker pink color was obtained by using a larger amount of such pigment.

A blue-tinted coating was produced by using 17 grams per mol of $SiO_2$ of a pigment known as "Vitro blue No. 13" composed of CoO and $Al_2O_3$.

A lavender color was obtained by using 2 grams per mole of $SiO_2$ of a solution of gold chloride (metallic gold dissolved in aqua regia) containing 10 grams of gold per 100 grams of solution.

A yellow color was obtained by using 1.7 grams per mol of $SiO_2$ of a pigment composed of CdS which had been heated for 4 hours at 500° C.

A yellow color was also obtained by using 1.7 grams per mol of $SiO_2$ of precipitated barium chromate.

A yellow color was also obtained by using 3.6 grams per mol of $SiO_2$ of a pigment known as "Naples yellow" and composed of lead antimonate.

A flesh color was obtained by using 1.7 grams per mol of $SiO_2$ of a pigment known as "Drakenfeld red No. 2370," which had been preheated for 4 hours at 500° C.

A light brown color was obtained by adding to the silica suspension a solution of ferric nitrate in the proportions 5.1 grams $Fe(NO_3)_3$ per mole of $SiO_2$. In this case the ferric nitrate is decomposed to $Fe_2O_3$ when the coated bulb is dried and the oxide of nitrogen is eliminated.

A green color was obtained by using a pigment composed of calcined $Cr_2O_3$ amounting to 17 grams per mol of $SiO_2$.

*Example 15*

To a silica suspension prepared according to Example 1 and containing 1.2 mols $SiO_2$ per liter of water and 0.01 mol MgO and 0.007 mol CaO per mol of $SiO_2$, there were added 10.5 grams of a zinc sulfide phosphor per mol of $SiO_2$ and the suspension was milled about 5 minutes in a colloid mill set with a clearance of 0.003 inch. The pH value was between 8 and 9. Bulbs coated with such suspension and dried for about 3 minutes at about 550° C. had adequate coating adherence, a uniform appearance and good filament-hiding power with a transmission of over 94%. The coating possessed substantial fluorescence particularly at the operating temperature of an incandescent lamp. The addition of 6 more grams of the phosphor to the suspension increased the amount of fluorescence slightly.

Phosphors which convert light of low lumen value such as ultraviolet radiations to light of high lumen value substantially increase the efficiency of the lamp. By utilizing a phosphor having a maximum emission of specific wave length a lamp emitting light of specific color can be produced.

While the various steps of the process can, if desired, be performed manually on a small scale, it is preferable to employ a semi-automatic apparatus capable of flushing a large number of bulbs, say 100 at a time, such as the apparatus designed for the frosting of bulbs and described in Smith Patent No. 1,899,485 but modified so as to include only flushing, draining and air-drying mechanisms. The cost increase resulting from such process is relatively minor.

The light-diffusing coating of this invention may also be applied to other types of light-transmitting glass surfaces. For example, the inner surface of a glass enclosing globe or the inwardly facing surface of a sheet or plate of glass, either plain or faceted on its outer surface for utilization in luminaires and the like, may be contacted with a silica suspension prepared as described herein. In such case the adherence of the coating may be increased by using a magnesium compound as is shown in Example 2.

The coating obtained in accordance with the present invention may also be employed to diffuse other types of radiation transmitted through a glass body. By way of example, such a coating may be applied to the inside surface of the outer envelope of a high pressure mercury arc lamp comprising a mercury arc tube of a fused silica enclosed within a glass lamp bulb. In lamps of this nature, which may be employed to produce either or both visible radiation and ultraviolet radiation, the coating serves not only to diffuse the visible radiation but also to produce diffusion of the ultraviolet radiation or to convert it into visible radiation by fluorescence.

I claim:

1. The method of producing a light-diffusing coating on the inner surface of a hollow radiation-transmitting glass article which comprises forming a slightly thixotropic aqueous suspension of solids consisting essentially of finely divided amorphous $SiO_2$ and at least one alkaline earth metal compound selected from the group consisting of formates, acetates, and propionates amounting to a total of 0.005 to 0.7 mol alkaline earth metal oxide per mol of $SiO_2$, the suspension containing 0.85 to 1.5 mols $SiO_2$ per liter of water and sufficient ammonia dissolved therein to have a pH value between 7.3 and 12 and a viscosity immediately after agitation of 7.5 to 12 centistokes at 25° C., flushing the interior of the article with said suspension, allowing excess suspension to drain from the article and rapidly drying the adherent suspension at a temperature high enough to eliminate volatile constituents thereof but insufficient to soften the glass.

2. The method claimed in claim 1 in which the pH value of the suspension is between 7.3 and 9.

3. The method claimed in claim 1 in which the total amount of the alkaline earth metal compound is 0.01 to 0.1 mol, on the oxide basis, per mol of $SiO_2$.

4. The method claimed in claim 1 in which the alkaline earth metal compound is a formate.

5. The method claimed in claim 1 in which the alkaline earth metal is magnesium.

6. The method claimed in claim 1 in which the suspension contains a finely divided inorganic coloring material.

7. A hollow radiation-transmitting glass article having on its inner surface a light-diffusing coating consisting essentially of an intimate mixture of finely divided $SiO_2$ and at least one alkaline earth metal oxide in the total amount of 0.005 to 0.7 mol of alkaline earth metal oxide per mol of $SiO_2$.

8. The article claimed in claim 7 in which the total amount of the alkaline earth metal oxide is 0.01 to 0.1 mol per mol of $SiO_2$.

9. The article claimed in claim 7 in which the coating contains a mixture of MgO and CaO.

10. The article claimed in claim 7 in which the alkaline earth metal oxide is MgO.

11. The method of producing a light diffusing coating on the inner surface of a hollow radiation transmitting glass article which comprises forming a slightly thixotropic aqueous suspension of solids consisting essentially of finely divided amorphous $SiO_2$ and a mixture of at least one calcium compound selected from the group consisting of formates, acetates, and propionates, and at least one magnesium compound selected from the group consisting of formates, acetates, and propionates, in the proportions of 0.005 to 0.7 total mol of calcium and magnesium oxides per mol of $SiO_2$, the suspension containing 0.85 to 1.5 mols $SiO_2$ per liter of water and sufficient ammonia dissolved therein to have a pH value between 7.3 and 12 and a viscosity immediately after agitation of 7.5 to 12 centistokes at 25° C., flushing the interior of the article with said suspension, allowing excess suspension to drain from the article and rapidly drying the adherent suspension at a temperature high enough to eliminate volatile constituents thereof but insufficient to soften the glass.

References Cited in the file of this patent

UNITED STATES PATENTS

| | | |
|---|---|---|
| 1,464,101 | Luckiesh | Aug. 7, 1923 |
| 1,830,165 | Gustin | Nov. 3, 1931 |
| 1,900,104 | Hageman | Mar. 7, 1933 |
| 2,017,733 | Sakakura | Oct. 15, 1935 |